United States Patent [19]

Nakajima

[11] Patent Number: 4,837,749
[45] Date of Patent: Jun. 6, 1989

[54] ULTRASONIC IMAGING SYSTEM FOR OBTAINING ZOOM VIDEO IMAGES OF AN OBJECT

[75] Inventor: Hirotaka Nakajima, Tochigi, Japan

[73] Assignee: Kabushiki Kaisha Toshiba, Kawasaki, Japan

[21] Appl. No.: 120,777

[22] Filed: Nov. 16, 1987

Related U.S. Application Data

[63] Continuation of Ser. No. 753,994, Jul. 11, 1985, abandoned.

[30] Foreign Application Priority Data

Jul. 13, 1984 [JP] Japan ................... 59-145349

[51] Int. Cl.$^4$ ............................................ G03B 42/06
[52] U.S. Cl. ............................................ 367/7; 367/11; 340/731
[58] Field of Search ....................... 128/660.04

[56] References Cited

U.S. PATENT DOCUMENTS

| | | | |
|---|---|---|---|
| 4,375,671 | 3/1983 | Engle | 358/112 |
| 4,520,671 | 6/1985 | Hardin | 73/620 |
| 4,611,348 | 9/1986 | Williams et al. | 382/44 |

FOREIGN PATENT DOCUMENTS 3045766 6/1982 Fed. Rep. of Germany.
2011074 7/1979 United Kingdom.

*Primary Examiner*—Nelson Moskowitz
*Assistant Examiner*—Daniel T. Pihulic
*Attorney, Agent, or Firm*—Cushman, Darby & Cushman

[57] ABSTRACT

An ultrasonic imaging arrangement. The arrangement includes a probe having an array of oscillators for emitting ultrasonic waves toward an object to be tomographically imaged, a first converter, a line memory group including a plurality of line memories, a write zoom operation unit, a frame memory, read zoom operation unit and a second converter. Echo signals reflected from the object are converted into digital signals as ultrasonic data. The ultrasonic data are stored in the line memory group, and are stored in the frame memory after processing operations in the write zoom operation unit. The read zoom operation unit then reads the data from the frame memory and, if necessary, processes that data. The second converter converts the processed data into video signals and a tomography image of the object is displayed according to the video signals.

19 Claims, 5 Drawing Sheets (a)

(b)

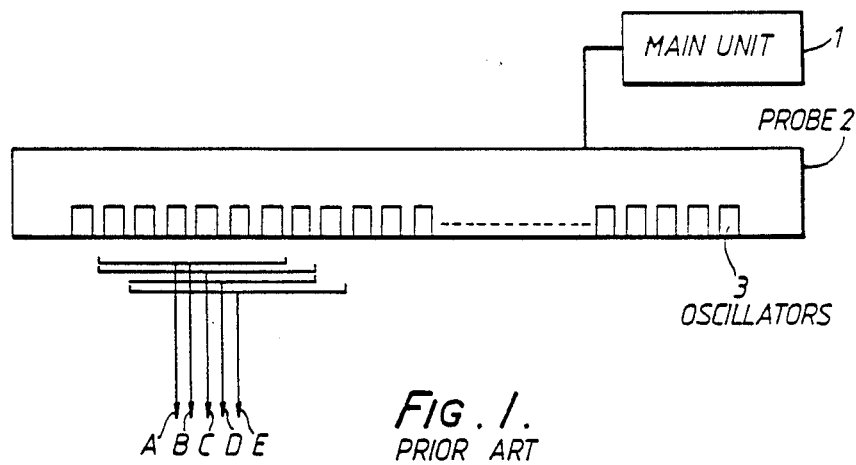
FIG. 1.
PRIOR ART
(a)
(b)
(c)
(d)
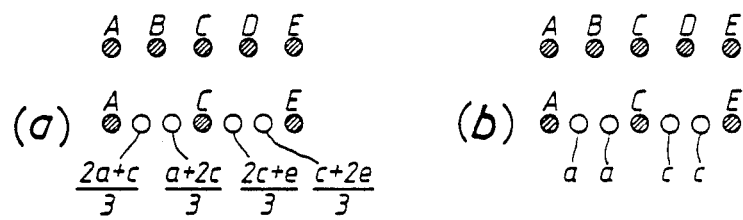
FIG. 2.
PRIOR ART
(a)                                    (b)
FIG. 3.
PRIOR ART

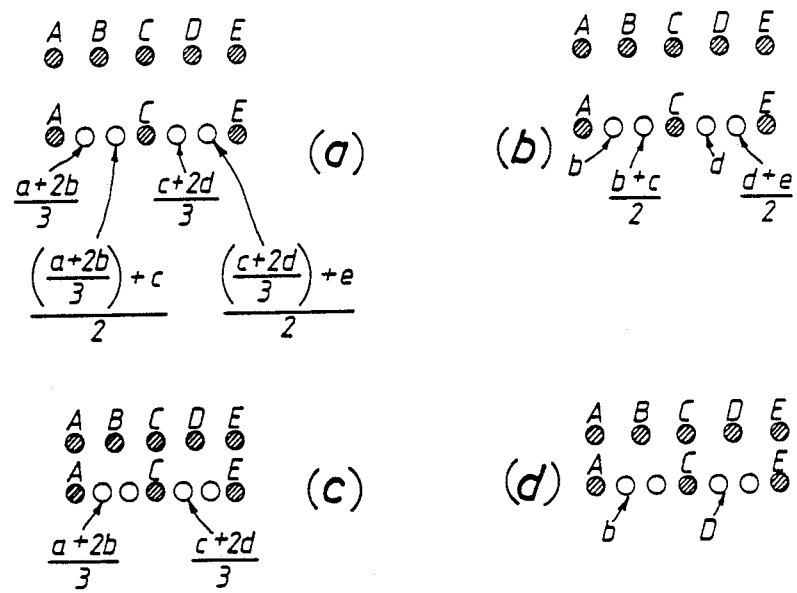
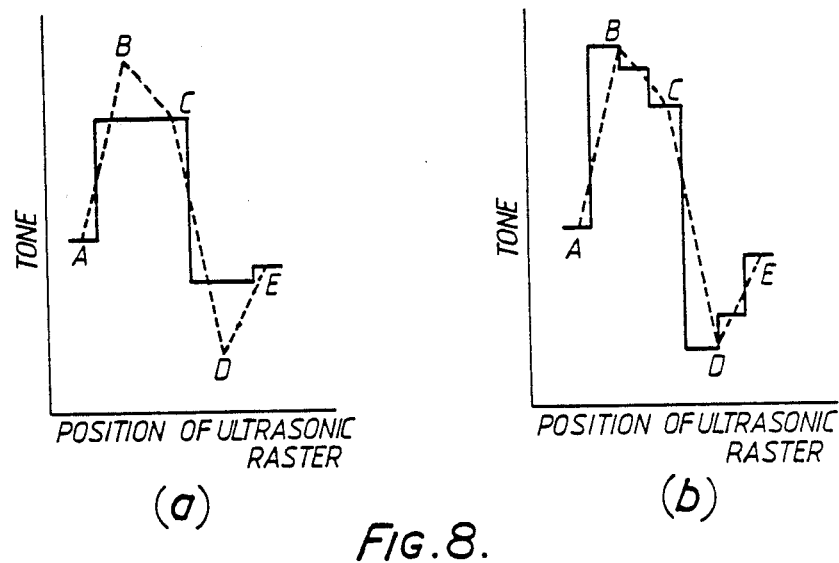
FIG.7.
FIG.8.

ULTRASONIC IMAGING SYSTEM FOR OBTAINING ZOOM VIDEO IMAGES OF AN OBJECT

This is a continuation of application Ser. No. 753,994, filed July 11, 1985, which was abandoned upon the filing hereof.

BACKGROUND OF THE INVENTION

1. Field of the Invention

This invention relates in general to ultrasonic imaging. The invention is particularly directed to linear scanning type ultrasonic imaging devices, and more specifically is directed to such a device in which the enlargement and contraction of an image are effected through combined write and read zoom operations at the predetermined magnification factor. This invention includes both apparatus for and methods of ultrasonic imaging.

2. Description of the Prior Art

A known linear scan type ultrasonic imaging system which can enlarge and contract an image emits ultrasonic beams from an array type probe for parallel run scanning of an object under examination. Echo signals are converted to digital signals for processing. Data from the digital signals of individual ultrasonic rasters corresponding to a given ultrasonic rate are stored in respective line memories of a line memory group. Then the data stored in line memories are stored in a frame memory for each frame. When reading out from the frame memory, the enlargement or contraction of the image is effected by using a read zoom operation. The readout data are then converted into analog signals, which are in turn converted into video signals for display on a television monitor.

However, some problems arise when an image which has been enlarged or contracted is obtained. These problems will be explained with reference to prior art FIGS. 1-4.

Referring first to FIG. 1 (prior art) there is shown a probe 2 having a linear array of oscillators 3. Oscillators 3 are linearly scanned by a main unit 1 of an ultrasonic imaging system. Certain combinations of oscillators 3 in probe 2 are selectively driven for oscillation at a given ultrasonic rate, whereby ultrasonic beams are transmitted from probe 2 in the form of ultrasonic rasters A to D at the ultrasoninc rate to an object for detection. When enlarging or contracting the image, the correspondence between the ultrasonic rasters and the pixels of the television display vary depending on the magnification factor in the manner shown in FIGS. 2(a)-2(d).

FIG. 2(a) shows the correspondence in a case in which the magnification factor is 1. In this case, the ultrasonic rasters and pixels for television display have a one-to-one correspondence with respect to each other. FIG. 2(b) shows the correspondence relation in a case where the magnification factor is 1.5. In this case, there is no perfect one-to-one correspondence between the ultrasonic rasters and pixels for television display. The ultrasonic raster A corresponds to the first pixel, so that ultrasonic data of the ultrasonic raster A is written for the first pixel. For the second and third pixel, however, there are no corresponding rasters, so no ultrasonic data is written for these pixels. For the fourth pixels, ultrasonic raster C is a corresponding raster, so the ultrasonic data of that raster is written for the fourth pixel, and so forth.

FIG. 2(c) shows the correspondence in a case in which the magnification factor is 2. In this case, ultrasonic raster A corresponds to the first pixel, so ultrasonic data of raster A is written for this pixel. For the second pixel, however, there is no corresponding raster, so no ultrasonic data is written for this cell. Ultrasonic raster B corresponds to the third pixel so its data is written for this pixel and so forth.

FIG. 2(d) shows the correspondence in a case in which the magnification factor is 0.75. In this case, there is no perfect one-to-one correspondence between the ultrasonic rasters and pixels for television display. Ultrasonic raster A corresponds to the first pixel so that its data is written for this pixel. For the second and third pixels, there are no corresponding ultrasonic rasters, so no ultrasonic data is written for these pixels. For the fourth pixel, data of ultrasonic raster E is written. For the fifth and sixth pixels, there are also no corresponding ultrasonic rasters, so no ultrasonic data are written in these pixels.

When there are ultrasonic rasters which are not in a one-to-one correspondence between ultrasonic rasters and pixels for television display or there are pixels for which no ultrasonic data can be written because there are no corresponding ultrasonic rasters, it has been an accepted practice to perform a read zoom operation in the manner shown in FIG. 3. An interpolation is carried out and data obtained by that interpolation is written into the pixel which has no one-to-one corresponding ultrasonic raster.

FIGS. 3(a) and (b) show two manners of read zoom operation at the magnification factor of 1.5. In the case of FIG. 3(a), data $(2a+c)/3$ is obtained from ultrasonic data a and c of ultrasonic rasters A and C, respectively, and is written for the second pixel. For the third pixel, data $(a+2c)/3$ is obtained and written. In the case of FIG. 3(b), the data of an ultrasonic raster A is written for the second and third pixels, and the data c of raster C is written for the fifth and sixth pixels.

When these interpolation operation read zooms are performed for television display, the tone characteristic of the displayed image is considerably different from the actual tone characteristic. That is, in the case of the data interpolation operation shown in FIG. 3(a), the tone characteristic, which is shown in FIG. 4(b), is different from the actual tone characteristic shown in FIG. 4(a). Also, in the case of the data interpolation shown in FIG. 3(b), the tone characteristic shown in FIG. 4(b) is different from the actual characteristic. Since the conventional manner has such problems, the image which has been enlarged or contracted is unsatisfactory.

SUMMARY OF THE INVENTION

The present invention provides an ultrasonic imaging system that overcomes these problems of the prior art. The system of the present invention includes a probe having an array of oscillators which are scanned by means for converting detected echos into digital signals, a line memory group including a plurality of line memories for storing ultrasonic data provided from the converting means, a frame memory for respectively storing one frame of the ultrasonic data from the line memory group, write zoom operation means for writing data obtained through predetermined operational processing into pixels of the frame memory which have no ultrasonic data when displaying an image with a given magnification, read zoom operation means for reading out data stored in the frame memory, and means for converting the output of the read zoom operation means into video signals and displaying an image defined by the video signals.

BRIEF DESCRIPTION OF THE DRAWINGS

These and other objects and advantages of this invention will become apparent and more readily appreciated from the following detailed description of the presently preferred exemplary embodiment taken in conjunction with the accompanying drawings, of which:

FIG. 1 (prior art) is a schematic diagram of a known linear scanning ultrasonic imaging system;

FIGS. 2(a)-2(d) (prior art) illustrate the correspondence between ultrasonic rasters and pixels for television display when an image is enlarged and contracted by the known system shown in FIG. 1 (prior art);

FIGS. 3(a) and 3(b) (prior art) illustrate a write zoom operation in the known system shown in FIG. 1 (prior art);

FIGS. 7(a)-7(d) are diagrams for explaining the correspondence between ultrasonic rasters and pixels for television display when an image is enlarged by the operation shown in FIG. 6; and FIGS. 8(a) and 8(b) are graphs of tone characteristics obtained when an image is displayed by using the technique shown in FIG. 7.

DETAILED DESCRIPTION OF THE PRESENTLY PREFERRED EXEMPLARY EMBODIMENT OF THIS INVENTION

Figure 5:
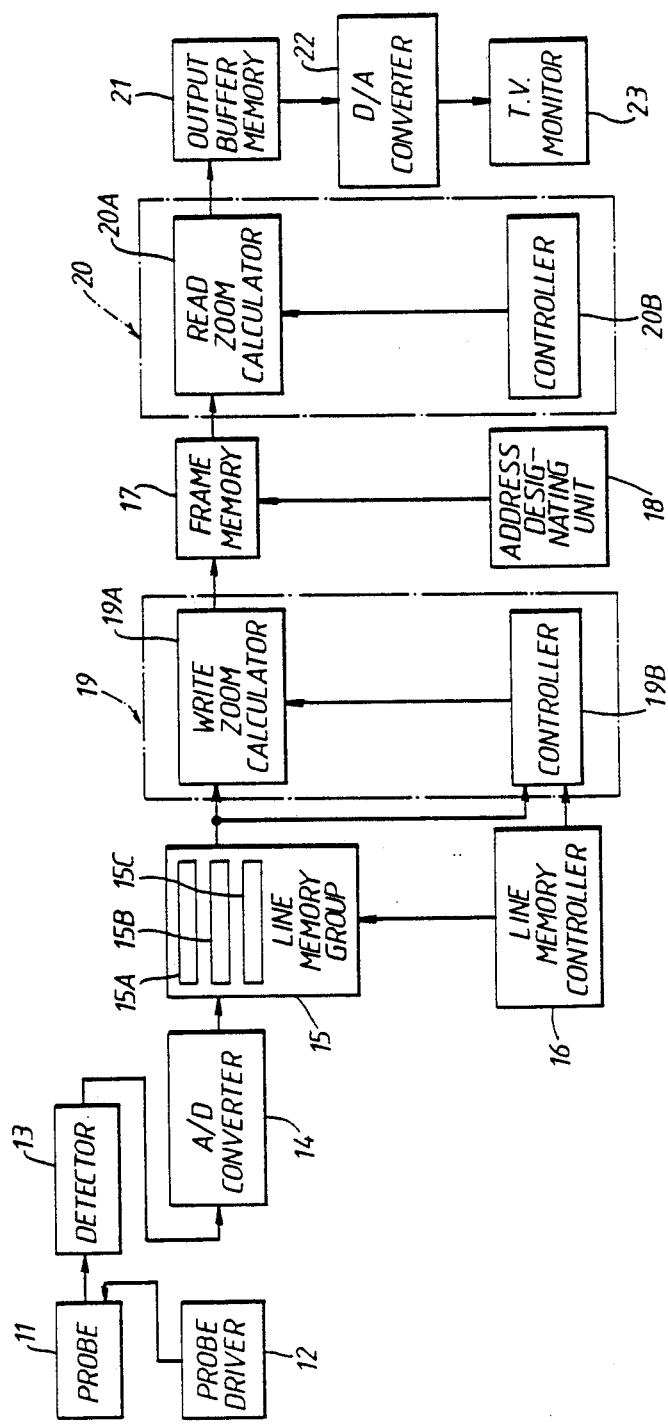
FIG. 5 is a block diagram of an ultrasonic imaging system according to the present invention.

In FIG. 5, a probe 11 has an array of oscillators (individual oscillators are not shown in FIG. 5). A probe driver 12 drives the oscillators of probe 11 selectively and at a given ultrasonic rate causing ultrasonic beams to be emitted by probe 11 for parallel run scanning of an object under examination. A detector 13 detects ultrasonic echo signals received by probe 11. An analog-to-digital converter 14 then converts the output of detector 13 into a digital signal. A line memory group 15, which includes first to third line memories 15A to 15C, stores ultrasonic data of ultrasonic rasters at the ultrasonic raster rate provided from converter 14 at times corresponding to the ultrasonic rate. A line memory controller 16 controls the distribution of the ultrasonic data output of analog-to-digital converter 14 to line memories 15A to 15C in line memory group 15.

A frame memory 17 is provided for storing each frame of ultrasonic data from line memory group 15. An address designating unit 18 designates addresses of frame memory 17 in which to write the ultrasonic data.

A write zoom operation unit 19 is provided such that, when displaying zoom data with a given magnification factor, it causes data obtained through a predetermined interpolation process performed on the ultrasonic data from line memory group 15 to be written for pixels corresponding to addresses of frame memory 17 which do not correspond to any of the ultrasonic rasters by making use of the ultrasonic rate. Write zoom operation unit 19 includes a write zoom calculator 19A and a calculation weight controller 19B. Write zoom calculator 19A provides data obtained through the predetermined interpolation process performed on the ultrasonic data from line memory group 15. Calculation weight controller 19B performs selection of ultrasonic data stored in first to third line memories 15A to 15C with respect to write zoom calculator 19A in synchronism with line memory controller 16.

A read zoom operation unit 20 reads out frame data stored in frame memory 17 such that an image based on the frame data is zoom displayed with a given magnification factor. Read zoom operation unit 20 performs a so-called read zoom operation to write data obtained through a data interpolation operation as shown, for example, in FIG. 3 (prior art), in an output buffer memory 21 which will be further described later. Read zoom operation unit 20 includes a read zoom calculator 20A and a calculation weight controller 20B.

Output buffer memory 21 stores imaging data fed from read zoom operation unit 20 through frame memory 17. A digital-to-analog converter 22 converts the output of output buffer memory 21 into analog signals. A television monitor 23 displays the video signal output of digital-to-analog converter 22.

The operation of the embodiment having the above construction will now be described.

Figure 6:
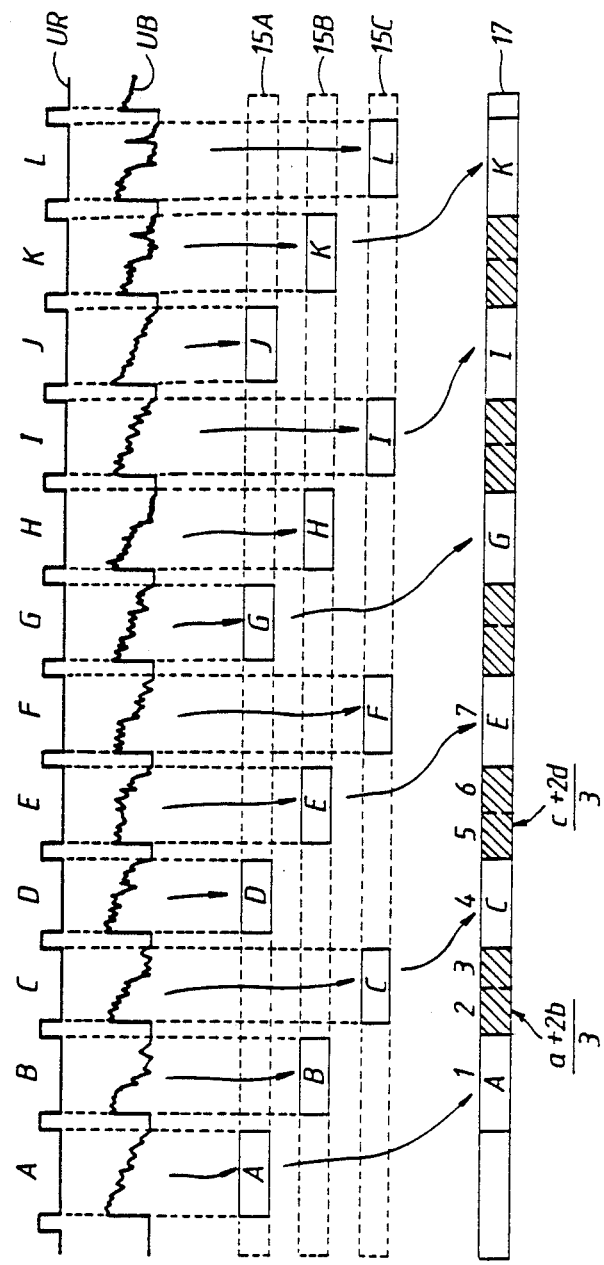
FIG. 6 is a diagram for explaining a write zoom operation in the ultrasonic imaging system shown in FIG. 5.

Probe driver 12 selectively drives the oscillators of probe 11 for oscillation at an ultrasonic rate UR as shown in FIG. 6, for instance, thus causing ultrasonic beams to be provided from probe 11 for parallel run scanning of an object under examination. Ultrasonic echo signals UE are thus obtained from probe 11 through detector 13, and these signals are converted by analog-to-digital converter 14 into digital signals. The ultrasonic data of the individual ultrasonic rasters corresponding to ultrasonic rate UR provided from analog-to-digital converter 14 are then written in first to third line memories 15A to 15C of line memory group 15 at the ultrasonic rate UR under the control of line memory controller 16.

When the image is neither enlarged nor contracted (i.e., when the magnification factor is 1), the ultrasonic data from line memory group 15 is stored in frame memory 17, and the video data output thereof are fed through output buffer memory 21 to digital-to-analog converter 22 for conversion to analog signals. Then it is converted into video signals and displayed on television monitor 23.

When the image is enlarged with a magnification of 1.5, however, there are correspondence-free pixels in the frame memory 17, i.e., the second, third, fifth, sixth and so forth pixels as shown at frame memory 17 in FIG. 6. These pixels are not in a one-to-one correspondence between ultrasonic rasters and pixels addresses of the frame memory 17. For these correspondence-free pixels, data are written in the manner as will be described below.

For the second and third pixels, calculation weight controller 19B extracts ultrasonic data a and b of ultrasonic rasters A and B from first and second line memories 15A and 15B. Write zoom calculator 19A then calculates $(a+2b)/3$. The data $(a+2B)/3$ is written in the second correspondence-free pixels. For the pixels for which there are corresponding ultrasonic rasters A, C and so forth, ultrasonic data a, c, e, ... of these ultrasonic rasters A, C, E, are written as such.

By the operation described above, image data with a magnification factor of 1.5 is written in frame memory 17 in the manner as shown in FIG. 7(c). In this state, no ultrasonic data are stored in frame memory 17 for the third pixel. Accordingly, read zoom operation unit 20 obtains, for instance, data ((a+2b)/3+c)/2 for the third pixel as shown in FIG. 7 (a)). In this case, calculation weight controller 20B performs appropriate weighting for calculation by conforming the number of pixels such that weighting is between adjacent pixels for which ultrasonic data are stored in frame memory 17. Read zoom calculator 20A performs calculation according to the weighting thus provided, and the result of this calculation is fed to output buffer memory 21.

By the above operation, image data with a magnification factor of 1.5 as shown in FIG. 7(a) is provided and fed through output buffer memory 21 to the digital-to-analog converter 22 for conversion to analog signals which are in turn converted to video signals for display as an image with a magnification factor of 1.5 a television monitor 23.

Figure 4:
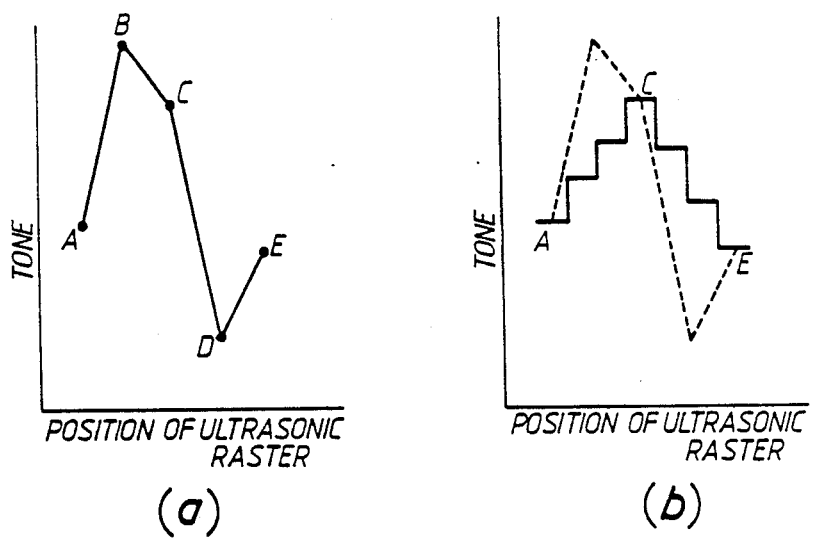
FIGS. 4(a)-4(c) (prior art) are graphs of tone characteristics that result when an image is displayed using the known zoom technique shown in FIG. 3 (prior art)
Figure 4:
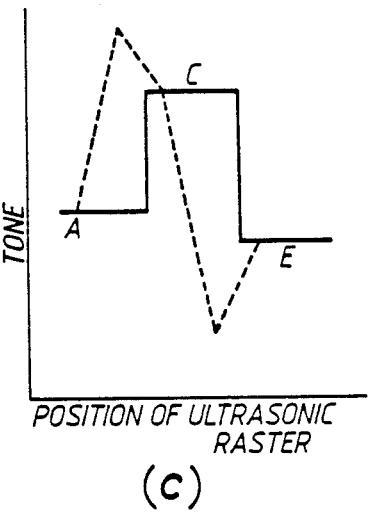

As has been shown, in the above embodiment the enlargement and contraction of images are effected through the write and read zoom operations. Thus, the tone characteristic based on the ultrasonic data of the ultrasonic rasters A to E as shown in FIG. 4(a) is changed to be as shown in FIG. 8(a) when the image is displayed with magnification factor of 1.5. The tone characteristic thus obtained is very close to the characteristic of FIG. 4(a) so that a satisfactorily enlarged image can be obtained.

The invention is not limited to the above-described embodiment. For example, data as shown in FIG. 7(b) may be written for the correspondence-free pixels of frame memory 17 (i.e., the second, third, fifth, sixth and so forth pixels). In this embodiment, for the second pixels calculation weight controller 19B extracts the ultrasonic data b of ultrasonic raster B from second line memory 15B and causes it to be written in frame memory 17 as shown in FIG. 7(d). Calculation weight controller 20B in read zoom operation unit 20 then determines the weight for read calculation, thereby causing read zoom calculator 20A to obtain data (b+c)/2. This data (b+c)/2 is fed to output buffer memory 21 for the third correspondence-free pixel. For the pixels for which there are corresponding ultrasonic rasters A, C, etc., ultrasonic data a, c, e, ... of the ultrasonic rasters A, C, E, ... are written as such in frame memory 17. These data are fed as such to output buffer memory 21. Thus, the tone characteristic based on the ultrasonic data of the ultrasonic rasters A to E as shown in FIG. 4(a) is changed to the one shown in FIG. 8(b), which is very close to the characteristics of FIG. 4(a) so that a satisfactory enlarged image can be obtained.

Furthermore, in the above embodiments, both write and read zoom operations are used. However, when the magnification rate is not needed, the read zoom operation is not used. Those skilled in the art will readily appreciate that many modifications are possible, given the teachings of the preferred embodiment, without materially departing from the novel techniques and advantages of this invention. Accordingly, all such modifications are intended to be covered by this invention as described in the following claims.

What is claimed is:

1. A method of magnifying ultrasonic image pixel data by a non-integer magnification rate so as to obtain a zoom video image from an ultrasonic image of an object, comprising the steps of:

emitting ultrasonic beams from a probe toward said object at a predetermined ultrasonic rate;

detecting ultrasonic echo signals produced when said ultrasonic beams are reflected from said object;

converting said ultrasonic echo signals into digital ultrasonic image pixel data representing said object;

storing said ultrasonic image pixel data in a plurality of line memories at the ultrasonic rate;

reading said ultrasonic image pixel data from said line memories;

first interpolating data of said read ultrasonic image pixel data positionally corresponding to display pixels of a display matrix of a display monitor, in accordance with said magnification rate, with ultrasonic image pixel data which do not positionally correspond to said display pixels, due to said magnification rate, using first and second weighting factors, respectively, said second weighting factor being non-zero, to thereby define first interpolated pixel data positionally corresponding to said display pixels in accordance with said magnification rate;

storing said ultrasonic image pixel data positionally corresponding to said display pixels as well as said first interpolated pixel data in a frame memory;

reading said ultrasonic image pixel data positionally corresponding to said display pixels and said first interpolated pixel data from said frame memory;

second interpolating said first interpolated pixel data and said ultrasonic image pixel data positionally corresponding to said display pixels read from said frame memory utilizing third and fourth non-zero weighting factors, respectively, to thereby define second interpolated pixel data positionally corresponding to said display pixels in accordance with said magnification rate;

converting said ultrasonic image pixel data positionally corresponding to said display pixels and said first and second interpolated pixel data into video signals; and displaying said video signals.

2. A method according to claim 1, wherein said ultrasonic image pixel data positionally corresponding to said display pixels are odd alternative pixels 0 of said ultrasonic image pixel data, and said ultrasonic image pixel data not positionally corresponding to said display pixels are even alternative pixels E of said ultrasonic image pixel data, a first weighting function $I_1 = E$ defining said first interpolated pixel data $I_1$, and a second weighting function $I_2 = (O + I_1)/2$ defining said second interpolated pixel data $I_2$.

3. A method according to claim 1, wherein said ultrasonic image pixel data positionally corresponding to said display pixels are odd alternative pixels 0 of said ultrasonic image pixel data, and said ultrasonic image pixel data not positionally corresponding to said display pixels are even alternative pixels E of said ultrasonic image pixel data, a first weighting function $I_1 = (0 + 2E)/3$ defining said first interpolated pixel data $I_1$, and a second weighting function $I_2 = (I_1 + 0)/2$ defining said second interpolated pixel data $I_2$.

4. A method according to claim 1, wherein said non-integer magnification rate is 3/2 and said first, second, third and fourth weighting factors are respectively ⅓, ⅔, ½ and ½.

5. A method according to claim 1, wherein said non-integer magnification rate is 3/2 and said first, second, third and fourth weighting factors are respectively 0, 1, ½ and ½.

6. An ultrasonic imaging system for magnifying ultrasonic image pixel data by a non-integer magnification rate so as to obtain a zoom image of an object on a display monitor having a matrix of display pixels including display pixels x1, x2, x3, x4, comprising:

means for generating ultrasonic image pixel data A,B,C at a predetermined ultrasonic rate, said ultrasonic image pixel data A and C positionally corresponding to the respective display pixels x1 and x4 of said display monitor, and said ultrasonic image pixel data B not positionally corresponding to said display pixels x2 and x3;

a frame memory for storing a frame of said ultrasonic image pixel data;

write interpolating means for first interpolating said ultrasonic image pixel data A positionally corresponding to said display pixel x1 with said ultrasonic image pixel data B using first and second weighting factors, respectively, said second weighting factor being non-zero, to thereby define first interpolated pixel data positionally corresponding to said display pixel x2, and for writing said first interpolated pixel data in addition to said ultrasonic image pixel data A and C positionally corresponding to said display pixels x1 and x4 into said frame memory;

read interpolating means for reading said first interpolated pixel data and said ultrasonic image pixel data A and C from said frame memory and for second interpolating said first interpolated pixel data and said ultrasonic image pixel data C positionally corresponding to said display pixel x4 using third and fourth non-zero weighting factors, respectively, to thereby define second interpolated pixel data positionally corresponding to said display pixel x3; and means for converting said first and second interpolated pixel data in addition to said ultrasonic image pixel data A and C into video signals for display on said display monitor.

7. A system according to claim 6, wherein said first interpolated pixel data are represented as B and said second interpolated pixel data are represented as $(B+C)/2$.

8. A system according to claim 6, wherein said first interpolated pixel data are represented as $(A+2B)/3$ and said second interpolated data are represented as $(B'+C)/2$, where B' is $(A+2B)/3$.

9. A system according to claim 6, wherein said non-integer magnification rate is 3/2 and said first, second, third and fourth weighting factors are respectively $\frac{1}{3}$, $\frac{2}{3}$, $\frac{1}{2}$ and $\frac{1}{2}$.

10. A system according to claim 6, wherein said non-integer magnification rate is 3/2 and said first, second, third and fourth weighting factors are respectively 0, 1, $\frac{1}{2}$ and $\frac{1}{2}$.

11. An ultrasonic imaging system for magnifying ultrasonic image pixel data by a non-integer magnification rate so as to obtain a zoom image of an object on a display monitor having a matrix of display pixels, comprising:

probe means for directing ultrasonic beams toward said object at a predetermined ultrasonic rate and for detecting ultrasonic echo signals produced when said ultrasonic beams are reflected from said object;

means for converting said ultrasonic echo signals into digital ultrasonic image pixel data representing said object;

line memory means having a plurality of line memories for storing said ultrasonic image pixel data at the predetermined ultrasonic rate;

a frame memory for storing a frame of said ultrasonic image pixel data;

write interpolating means for reading said ultrasonic image pixel data from said line memories, for first interpolating data of said ultrasonic image pixel data positionally corresponding to said display pixels, in accordance with said magification rate, with ultrasonic image pixel data which do not positionally correspond to said display pixels, due to said magnification rate, utilizing first and second weighting factors, respectively, said second weighting factor being non-zero, to thereby define first interpolated pixel data positionally corresponding to said display pixels in accordance with said magnification rate, and for writing said first interpolated pixel data as well as said ultrasonic image pixel data positionally corresponding to said display pixels into said frame memory;

read interpolating means for reading said first interpolated pixel data as well as said ultrasonic image pixel data positionally corresponding to said display pixels from said frame memory and for second interpolating said first interpolated pixel data and said ultrasonic image pixel data positionally corresponding to said display pixels read from said frame memory utilizing third and fourth non-zero weighting factors, respectively, to thereby define second interpolated pixel data positionally corresponding to said display pixels in accordance with said magnification rate; and means for converting said first and second interpolated pixel data as well as said ultrasonic image pixel data positionally corresponding to said display pixels into video signals for display on said display monitor.

12. A system according to claim 11, wherein said display monitor comprises a television monitor.

13. A system according to claim 11, wherein said means for converting data into video signals comprises an output buffer memory and a D/A converter.

14. A system according to claim 11, wherein said line memory means comprises three line memories.

15. A system according to claim 14, wherein one of said line memories alternatively holds said ultrasonic image pixel data provided from said converting means and the rest of said line memories provide ultrasonic image pixel data previously held therein.

16. A system according to claim 11, wherein said ultrasonic image pixel data positionally corresponding to said display pixels are odd alternative pixels O of said ultrasonic image pixel data, and said ultrasonic image pixel data not positionally corresponding to said display pixels are even alternative pixels E of said ultrasonic image pixel data, a first weighting $I_1=(O+2E)/3$ defining said first interpolated pixel data $I_1$, and a second weighting function $I_2=(I_1+O)/2$ defining said second interpolated pixel data $I_2$.

17. A system according to claim 11, wherein said ultrasonic image pixel data positionally corresponding to said display pixels are odd alternative pixels O of said ultrasonic image pixel data, and said ultrasonic image pixel data not positionally corresponding to said display pixels are even alternative pixels E of said ultrasonic image pixel data, a first weighting function $I_1 = E$ defining said first interpolated pixel data $I_1$, and a second weighting function $I_2 = (I_1 + 0)/2$ defining said second interpolated pixel data $I_2$.

18. A system according to claim 11, wherein said non-integer magnification rate is 3/2 and said first, second, third and fourth weighting factors are respectively $\frac{1}{3}$, $\frac{2}{3}$, $\frac{1}{2}$ and $\frac{1}{2}$.

19. A system according to claim 11, wherein said non-integer magnification rate is 3/2 and said first, second, third and fourth weighting factors are respectively 0, 1, $\frac{1}{2}$ and $\frac{1}{2}$.

* * * * *